(12) United States Patent  
Shtukater

(10) Patent No.: US 11,333,902 B2  
(45) Date of Patent: **\*May 17, 2022**

(54) SMART CONTACT LENS WITH EMBEDDED DISPLAY AND IMAGE FOCUSING SYSTEM

(71) Applicant: Aleksandr Shtukater, Fair Lawn, NJ (US)

(72) Inventor: Aleksandr Shtukater, FairLawn, NJ (US)

(73) Assignee: RaayonNova LLC, Fair Lawn, NJ (US)

( \* ) Notice: Subject to any disclaimer, the term of this patent is extended or adjusted under 35 U.S.C. 154(b) by 416 days.

This patent is subject to a terminal disclaimer.

(21) Appl. No.: 15/839,500

(22) Filed: Dec. 12, 2017

(65) Prior Publication Data

US 2019/0179165 A1 Jun. 13, 2019

(51) Int. Cl.
| | |
|---|---|
| *G02C 7/04* | (2006.01) |
| *G06F 3/01* | (2006.01) |
| *G02B 27/00* | (2006.01) |
| *G06T 1/20* | (2006.01) |
| *G06T 3/20* | (2006.01) |
| *G06T 19/00* | (2011.01) |
| *G06V 20/20* | (2022.01) |

(52) U.S. Cl.
CPC .......... *G02C 7/049* (2013.01); *G02B 27/0093* (2013.01); *G02C 7/04* (2013.01); *G06F 3/012* (2013.01); *G06F 3/013* (2013.01); *G06T 1/20* (2013.01); *G06T 3/20* (2013.01); *G06T 19/006* (2013.01); *G06V 20/20* (2022.01)

(58) Field of Classification Search
CPC ........ G06F 1/1637; G06F 3/013; G06F 3/017; G02B 27/0179; H04N 13/383; H04N 5/23212; G02C 7/04; G02C 7/083; A61B 3/113

See application file for complete search history.

(56) References Cited

U.S. PATENT DOCUMENTS

| | | | | |
|---|---|---|---|---|
| 5,682,210 | A * | 10/1997 | Weirich | G02B 27/017 345/32 |
| 6,886,137 | B2 * | 4/2005 | Peck | G06F 3/0485 345/158 |
| 8,096,654 | B2 * | 1/2012 | Amirparviz | B29D 11/00826 345/8 |
| 9,063,351 | B1 * | 6/2015 | Ho | G02C 7/04 |
| 9,111,473 | B1 * | 8/2015 | Ho | G02B 1/043 |
| 9,304,319 | B2 * | 4/2016 | Bar-Zeev | G02B 3/14 |
| 9,442,310 | B2 * | 9/2016 | Biederman | G02C 7/083 |
| 9,671,619 | B2 * | 6/2017 | Pugh | A61B 3/10 |
| 9,740,282 | B1 * | 8/2017 | McInerny | G06F 3/013 |
| 9,772,510 | B2 * | 9/2017 | Wiser | G02C 7/083 |

(Continued)

FOREIGN PATENT DOCUMENTS

| | | | | |
|---|---|---|---|---|
| EP | 2866123 A2 * | 4/2015 | ............ | G06F 3/012 |
| KR | 20110040199 A * | 4/2011 | | |

(Continued)

*Primary Examiner* — John Villecco

(57) ABSTRACT

A contact lens system is provided. The contact lens includes a contact lens substrate, an embedded display, and a processor. The embedded display may form a part of the contact lens substrate. The processor is configured to shift at least a part of an image to a central position of the embedded display to bring the part of the image into focus on the embedded display.

21 Claims, 8 Drawing Sheets

(56) References Cited

U.S. PATENT DOCUMENTS

| | | | |
|---|---|---|---|
| 9,772,512 B2* | 9/2017 | Yeager | G02C 7/048 |
| 9,775,513 B1* | 10/2017 | Ho | G02C 7/04 |
| 9,810,926 B2* | 11/2017 | Sako | G02C 11/10 |
| 9,823,744 B2* | 11/2017 | Publicover | G06F 21/64 |
| 9,888,843 B2* | 2/2018 | Moller | A61B 3/0025 |
| 9,933,620 B2* | 4/2018 | Van Heugten | G02C 7/04 |
| 9,933,634 B2* | 4/2018 | Wiser | G02C 7/049 |
| 9,939,658 B1* | 4/2018 | Gutierrez | G02C 7/083 |
| 9,948,895 B1* | 4/2018 | Wiser | H04N 5/225 |
| 10,247,947 B2* | 4/2019 | Van Heugten | G02C 7/04 |
| 10,319,148 B2* | 6/2019 | Lo | G02B 3/14 |
| 10,353,463 B2* | 7/2019 | Shtukater | G06F 3/012 |
| 10,359,648 B2* | 7/2019 | Kim | G02C 11/10 |
| 10,394,057 B2* | 8/2019 | Starner | A61B 3/10 |
| 10,481,403 B2* | 11/2019 | Martin | G02C 7/049 |
| 10,502,979 B2* | 12/2019 | Barrows | A61F 2/1635 |
| 10,718,957 B2* | 7/2020 | Wiemer | G02C 11/10 |
| 10,901,505 B1* | 1/2021 | Haine | G02B 27/0093 |
| 2004/0027536 A1* | 2/2004 | Blum | B29D 11/00826 351/159.03 |
| 2010/0001926 A1* | 1/2010 | Amirparviz | A61B 5/1455 345/7 |
| 2013/0002846 A1* | 1/2013 | De Bruijn | A61B 3/113 348/78 |
| 2014/0098226 A1* | 4/2014 | Pletcher | H04N 7/18 348/143 |
| 2014/0240657 A1* | 8/2014 | Pugh | G02C 7/04 351/159.03 |
| 2014/0240665 A1* | 8/2014 | Pugh | G02C 7/04 351/205 |
| 2014/0243971 A1* | 8/2014 | Pugh | A61F 2/1624 623/6.22 |
| 2015/0061990 A1* | 3/2015 | Toner | A61B 3/10 345/156 |
| 2015/0062533 A1* | 3/2015 | Toner | G02C 7/049 351/209 |
| 2015/0128075 A1* | 5/2015 | Kempinski | G06F 3/012 715/765 |
| 2015/0135132 A1* | 5/2015 | Josephson | G06F 3/0236 715/784 |
| 2015/0301338 A1* | 10/2015 | Van Heugten | G02C 7/04 345/8 |
| 2015/0338915 A1* | 11/2015 | Publicover | H04N 5/44504 345/633 |
| 2015/0362756 A1* | 12/2015 | Wiser | G02C 7/04 351/210 |
| 2016/0003760 A1* | 1/2016 | Etzkorn | G02C 11/10 205/122 |
| 2016/0091737 A1* | 3/2016 | Kim | G02C 7/04 156/60 |
| 2016/0147301 A1* | 5/2016 | Iwasaki | A61B 3/113 345/157 |
| 2016/0246054 A1* | 8/2016 | Bedell, Jr. | G06F 3/04817 |
| 2016/0290600 A1* | 10/2016 | Biederman | F21V 9/30 |
| 2016/0299354 A1* | 10/2016 | Shtukater | G02C 7/04 |
| 2017/0023793 A1* | 1/2017 | Shtukater | G02B 27/0179 |
| 2017/0097519 A1* | 4/2017 | Lee | A61B 3/113 |
| 2017/0097520 A1* | 4/2017 | Lee | G02C 11/10 |
| 2017/0227771 A1* | 8/2017 | Sverdrup | G02B 5/289 |
| 2017/0227792 A1* | 8/2017 | Starner | A61B 5/1103 |
| 2017/0270636 A1* | 9/2017 | Shtukater | G06T 3/20 |
| 2017/0354326 A1* | 12/2017 | Pugh | A61B 3/10 |
| 2017/0354328 A1* | 12/2017 | Ho | G02C 7/04 |
| 2017/0371184 A1* | 12/2017 | Shtukater | G02C 11/10 |
| 2018/0017814 A1* | 1/2018 | Tuan | G02C 11/10 |
| 2018/0039085 A1* | 2/2018 | Van Heugten | G02C 7/04 |
| 2018/0173011 A1* | 6/2018 | Barrows | G02C 7/083 |
| 2018/0173012 A1* | 6/2018 | Barrows | G02C 7/049 |
| 2018/0173013 A1* | 6/2018 | Robillotto | A61B 5/7225 |
| 2018/0335836 A1* | 11/2018 | Miller | G02B 27/0093 |
| 2019/0090737 A1* | 3/2019 | Pugh | A61B 5/0002 |
| 2019/0101979 A1* | 4/2019 | Zhang | G02B 27/017 |
| 2019/0113757 A1* | 4/2019 | Van Heugten | G02C 7/04 |
| 2019/0235276 A1* | 8/2019 | Wiemer | G02C 11/10 |
| 2019/0235624 A1* | 8/2019 | Goldberg | G02B 27/0093 |
| 2019/0250413 A1* | 8/2019 | Martin | H04N 5/225 |
| 2019/0250432 A1* | 8/2019 | Kim | G02C 7/04 |
| 2019/0293964 A1* | 9/2019 | Takaki | G02C 7/049 |
| 2019/0333480 A1* | 10/2019 | Lang | G02B 27/0172 |
| 2019/0339770 A1* | 11/2019 | Kurlethimar | G06F 3/0346 |
| 2019/0377428 A1* | 12/2019 | Mirjalili | G03B 21/56 |
| 2020/0020308 A1* | 1/2020 | Deering | H04N 7/0117 |
| 2020/0060809 A1* | 2/2020 | Toner | A61B 5/7253 |
| 2021/0026444 A1* | 1/2021 | Haine | G06K 9/00335 |
| 2021/0124415 A1* | 4/2021 | Haine | G06F 3/011 |
| 2021/0181531 A1* | 6/2021 | Reedy | G02C 7/041 |
| 2021/0208674 A1* | 7/2021 | Haine | G06F 3/013 |
| 2021/0303107 A1* | 9/2021 | Pla I Conesa | G06F 3/0481 |
| 2022/0066549 A1* | 3/2022 | Bhat | G06F 3/013 |

FOREIGN PATENT DOCUMENTS

| | | | | |
|---|---|---|---|---|
| WO | WO-2014106330 A1 * | 7/2014 | | G02C 7/04 |
| WO | WO-2021080926 A1 * | 4/2021 | | G02B 27/0093 |
| WO | WO-2021262476 A1 * | 12/2021 | | |

\* cited by examiner

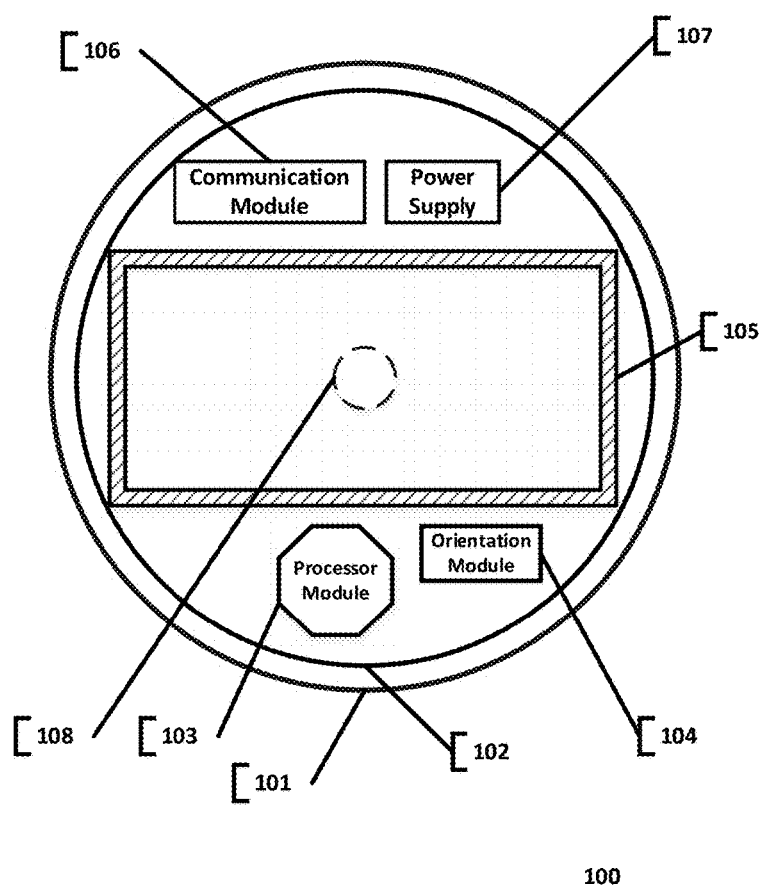
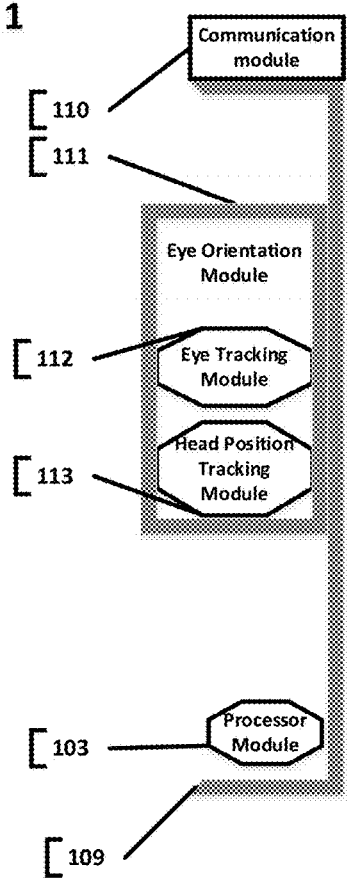
Fig 1

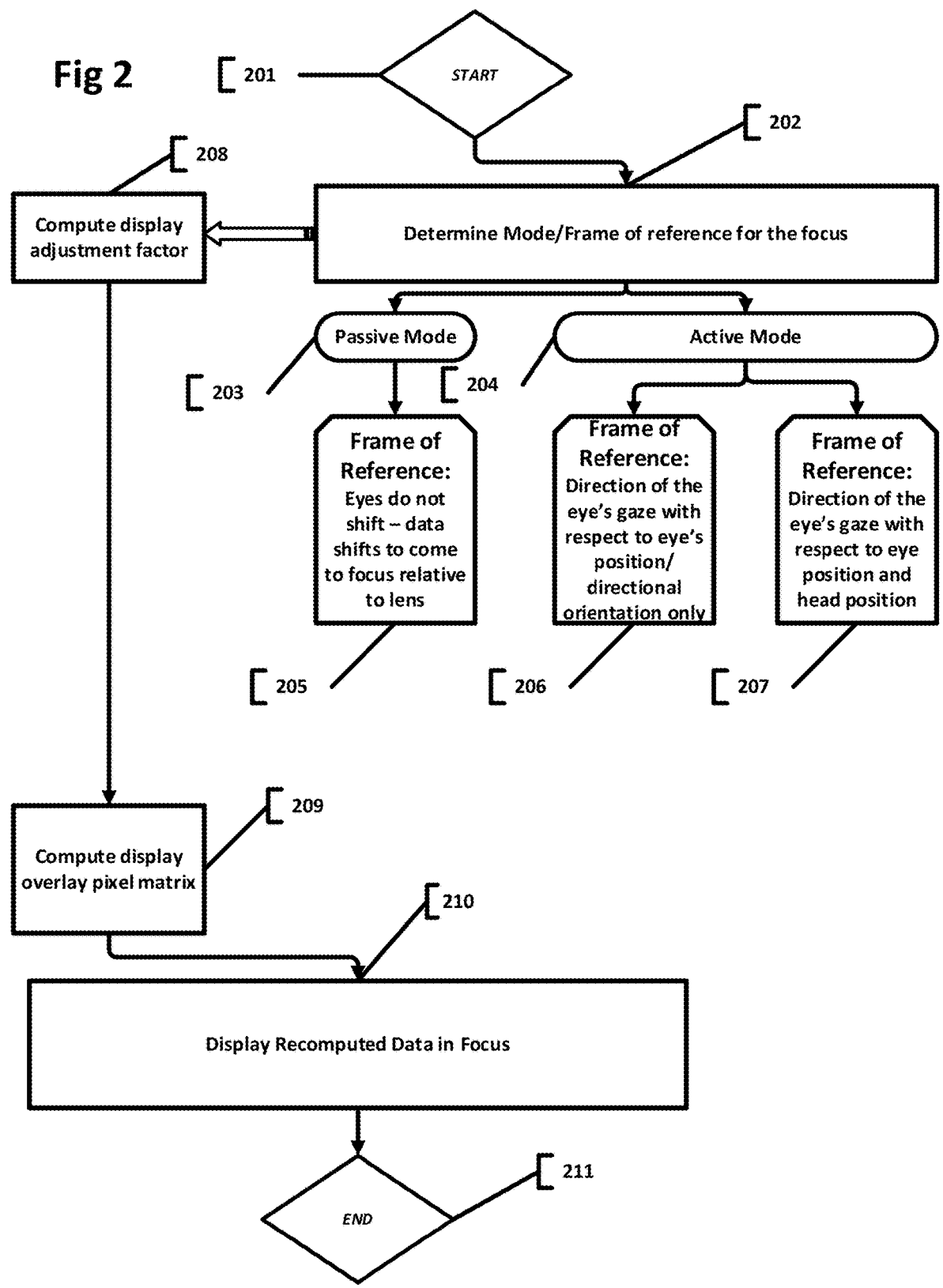

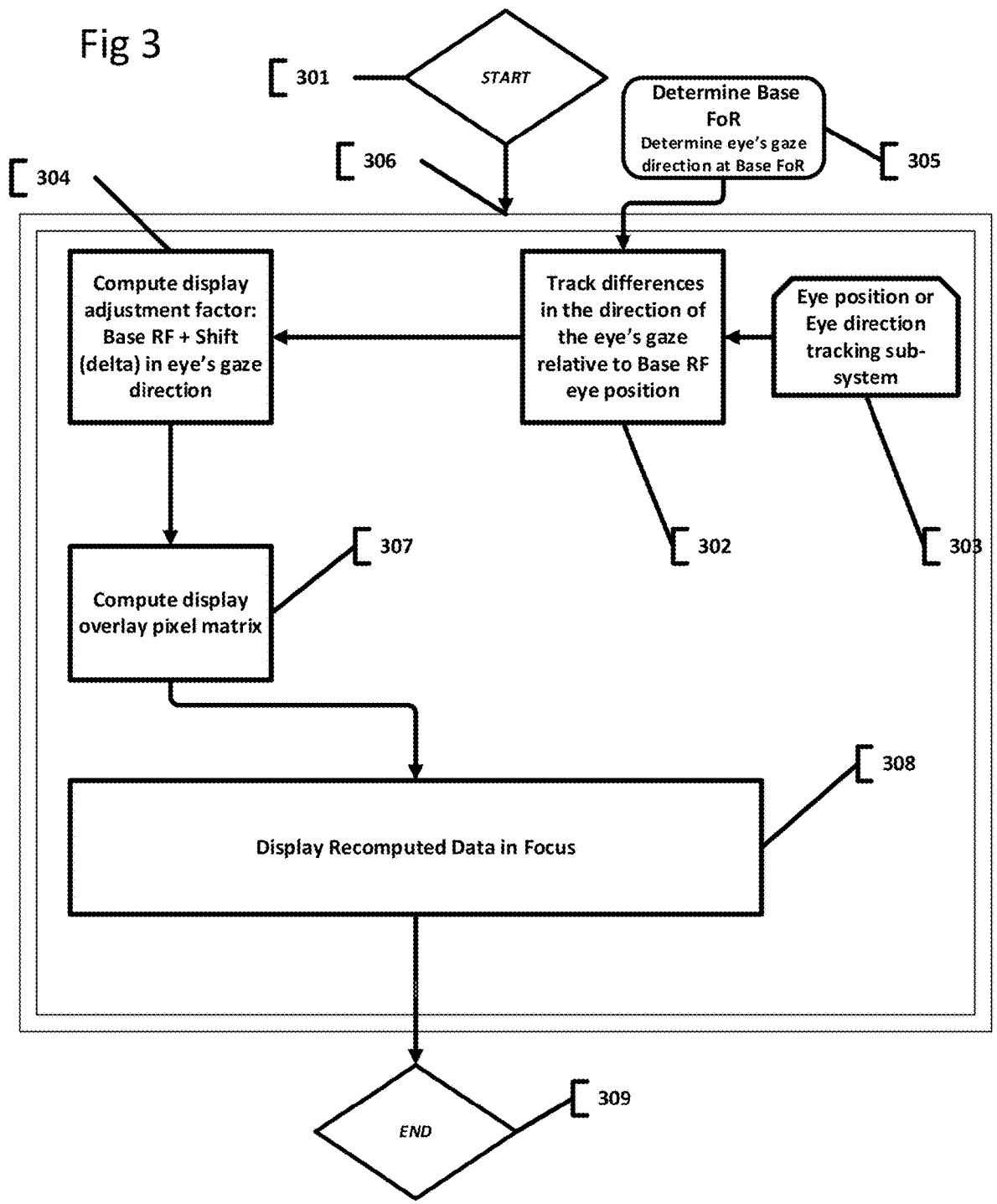

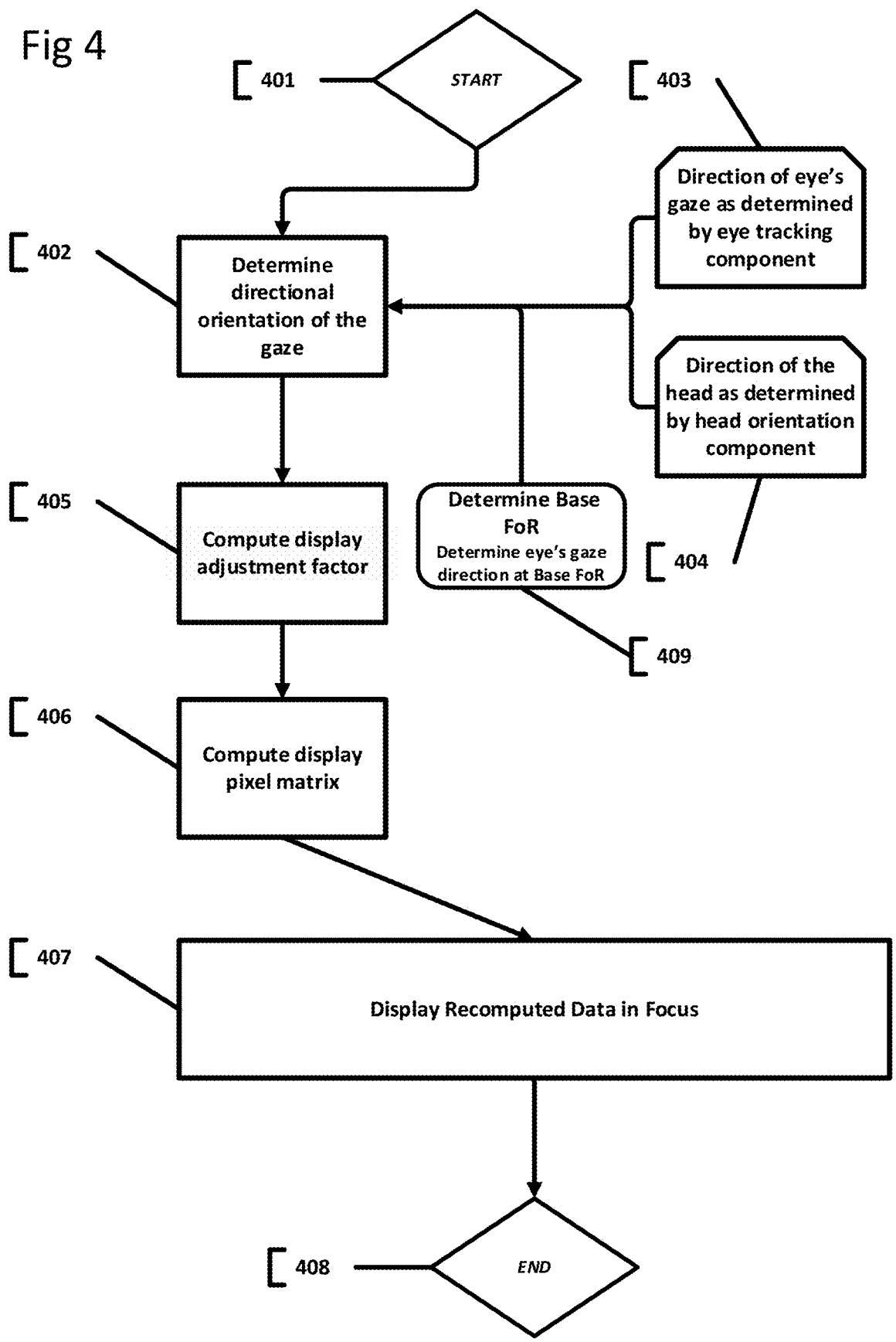

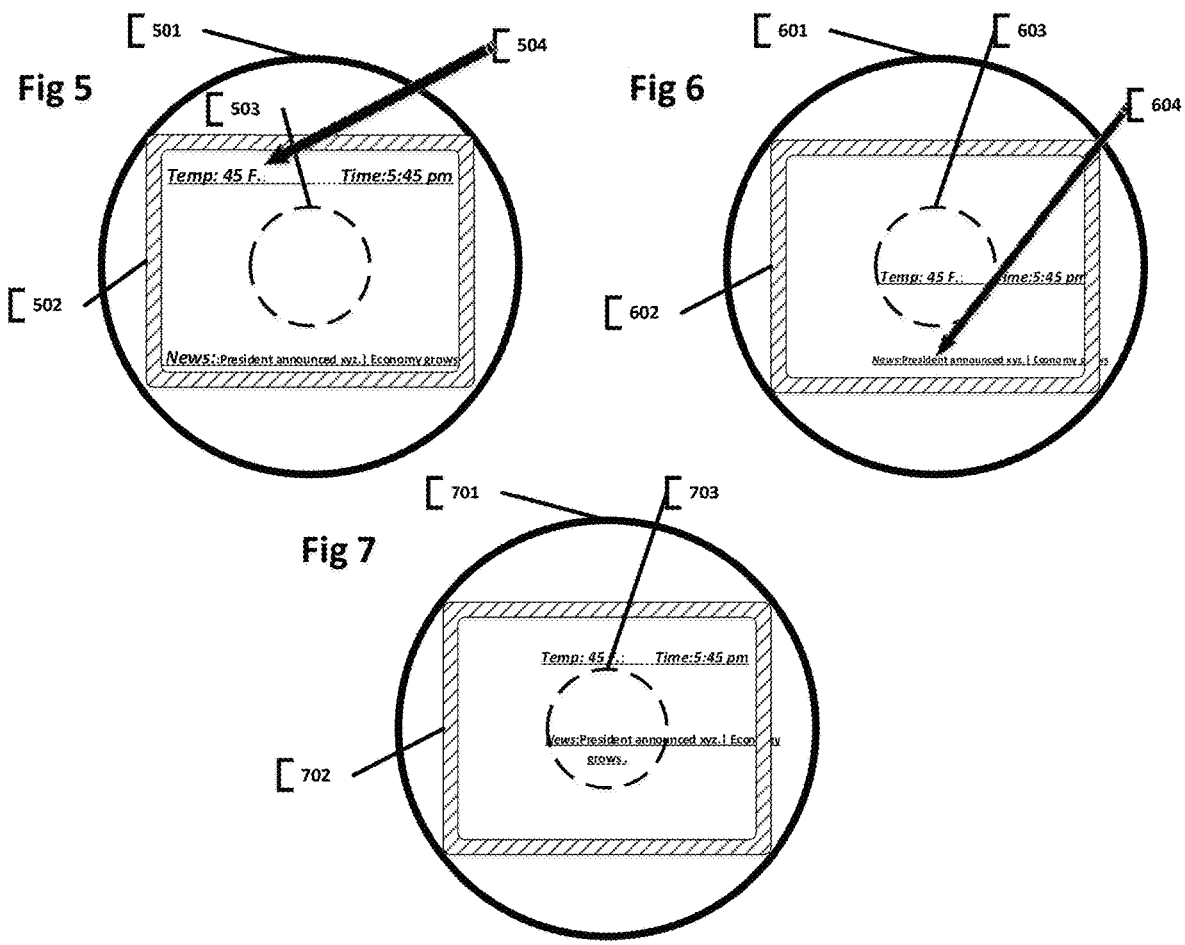

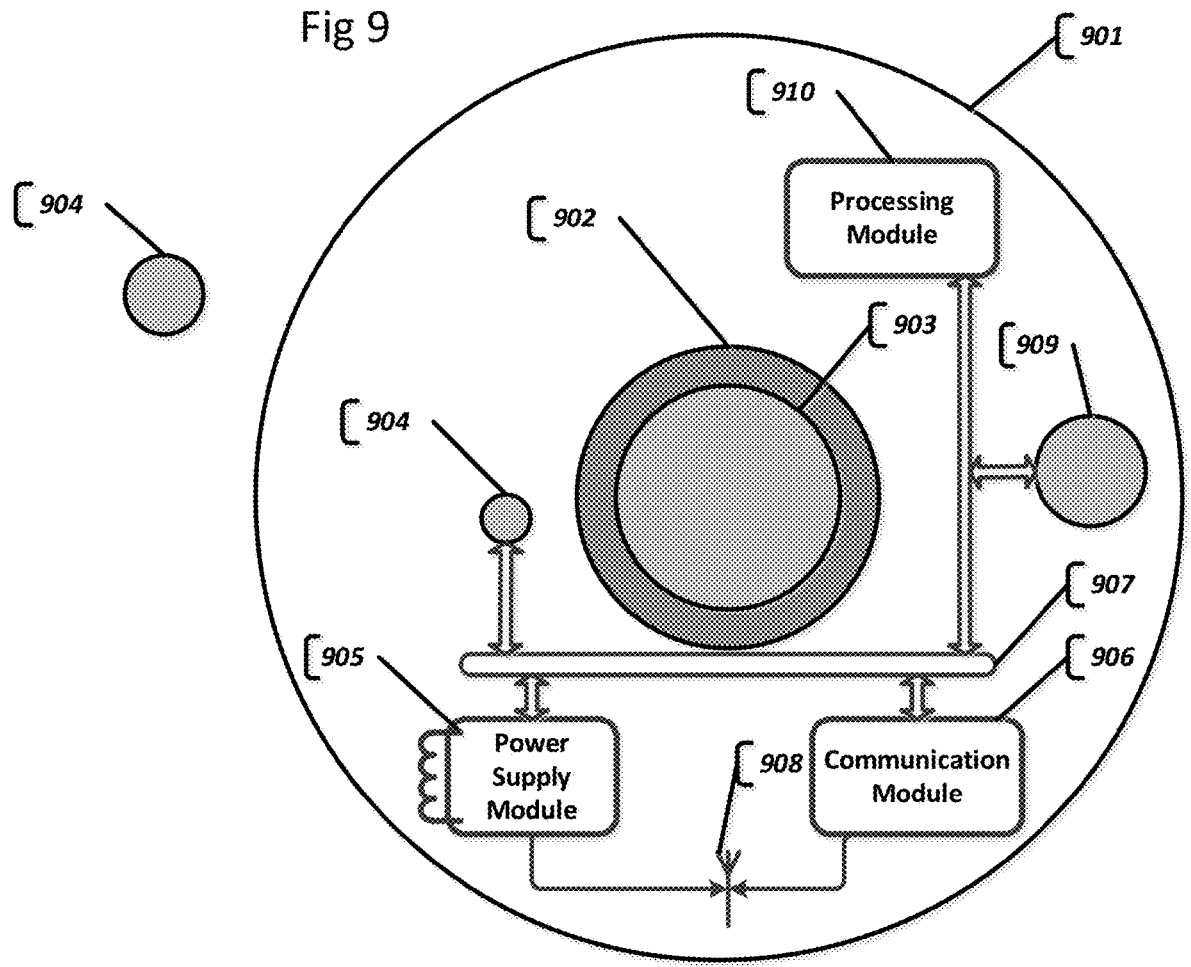

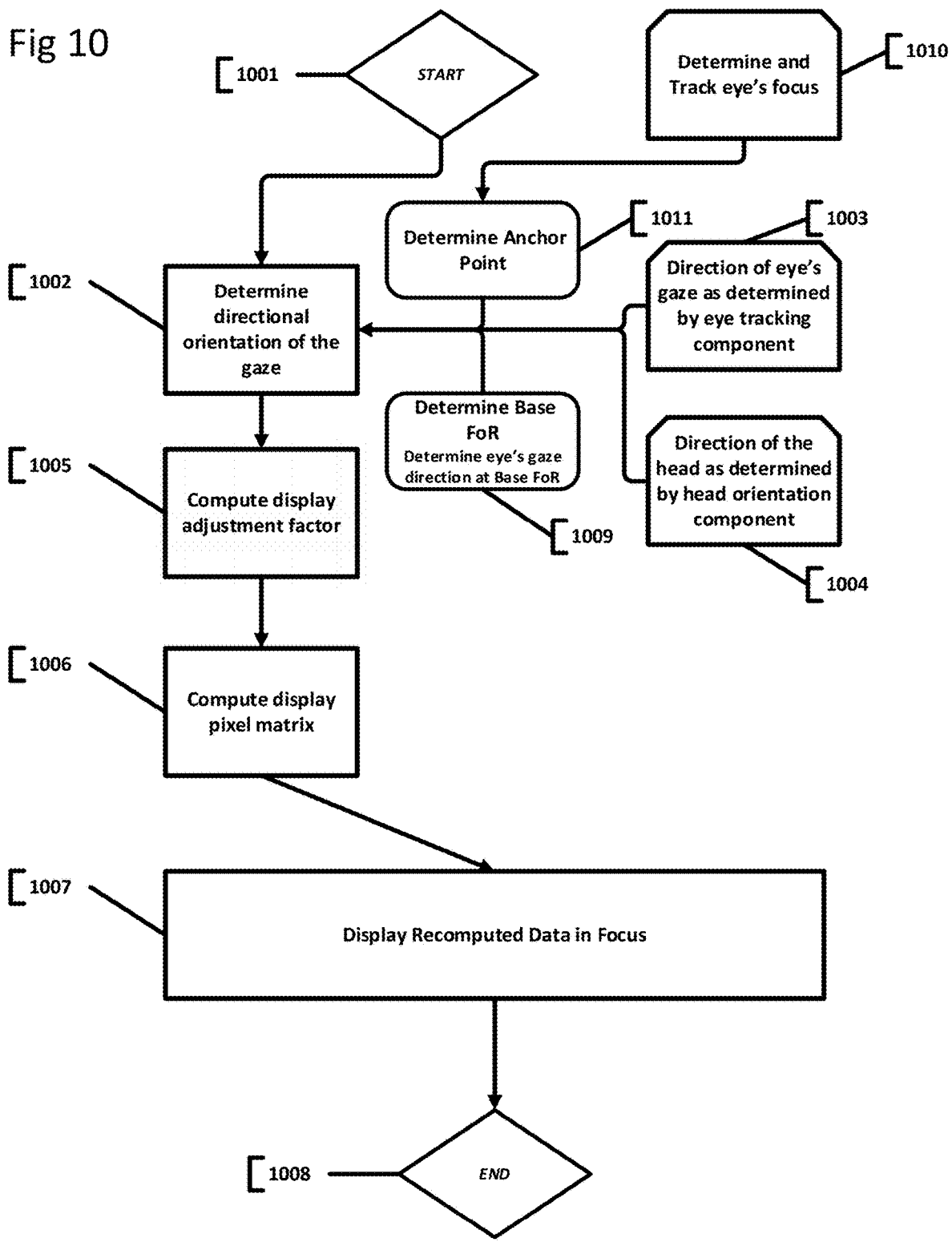

SMART CONTACT LENS WITH EMBEDDED DISPLAY AND IMAGE FOCUSING SYSTEM

CROSS REFERENCE TO RELATED APPLICATIONS

This application claims the benefit of U.S. Priority patent application Ser. No. 15/071,205 filed on Mar. 16, 2016, the entire contents of which are incorporated herein by reference. Related U.S. patent applications: Ser. No. 14/963,241 filed on Dec. 9, 2015, Ser. No. 14/803,022 filed on Jul. 17, 2015.

FIELD OF INVENTION

The present disclosure relates to the field of optics. More particularly, the present disclosure relates to the field of smart contact lenses (SCL).

BACKGROUND

Generally, human eye lets light reflected from an object to travel through a lens, there to hit retina that is a light sensitive surface located at the back of the human eye. The retina of the eye may generally be divided into several discreet sections that are differentiated by a level of their respective light sensitivities. For instance, the retina may be divided into a fovea and a peripheral area, wherein the peripheral area further includes a parafovea belt, circumscribing fovea, and a perifovea outer region further from a center of the peripheral area, circumscribing parafovea. Retina mostly consists of two types of photoreceptor cells: cones for daytime colored perception and rods for dim light and black-and-white vision. In human eye, there are approximately 7 million cones and in the range of 75 to 150 million rods. Fovea, which is at the center of the retina consists of mostly cones so allows for good quality colored vision. The fovea enables a clear, a sharply focused, and a colored vision, whereas the peripheral area is used for a low light vision, for detection of movements and for discerning between different colors and shapes.

A sharp vision is possible due to a foveal area which is situated at the bottom of the eye directly in front of the lens of the human eye. However, the foveal area represents only several degrees of visual angle that enables a person to see a very limited portion of the observed view in sharp focus. Further, a peripheral vision is critically important and plays a crucial role in visual perception. Brain registers and processes information that falls into the region of the foveal area as well as information from the peripheral area. Initial and partial visual data acquisition is performed via peripheral view and for full and detailed data acquisition eye moves to bring information of interest into focus; that is to sense an image in focus with foveal area.

Normally, in conventional vision systems, whenever an image is displayed in front of the user, such as on TV, a tablet or any other head mounted displays, location of the view remains constant and only eyes gaze direction changes relative to a stationary part of the image on the display to focus on other portions of the display in order to have full image data ingestion.

However, provided, a transparent or a semi-transparent or a non-transparent display is embedded into the contact lens, an image or a video being superimposed onto the real world objects view, in front of the user, maybe displayed. Such kind of an embedded display is naturally, spatially associated with and locked in, relative to a position of the human eye. Because the embedded display will be shifting with every movement of the eye, only a part of the image being present at the center of the embedded display, would be in sharp focus and a user will not be able to perceive other parts of the superimposed image in clear focus. Further, the human eye position adjustments will not enable the eye to see other parts of the image, in focus because the embedded display moves with the movement of the human eye and an image disposition on display, a priori, does not change.

Furthermore, information about real world objects present in front of the user is superimposed onto the embedded display in spatial respect to geometry of objects visible to the user. For instance, an Augmented Reality enabled application recognizes real world objects, determines contextual annotations/descriptions associated with the recognized real world objects and superimposes onto the embedded display, information related to the real world objects in such a way that the information is overlaid near or over the real world objects in the view. In such an application, the information which will be a virtual object that would appear stationary relative to specific surrounding environment of the user. In another exemplary, application of an display integrated into contact lens, information may be superimposed onto display irrespective the spatial position of objects in the view of an observer. For example, text (article, book, etc. . . . ), dashboard, with temperature, time, stock quotes, running news line and other information. This data is independent of what the user sees via the contact lens. In another exemplary, application of display integrated into the contact lens is Virtual Reality (VR), wherein the view presented to the user is semi-transparent or non transparent, creating virtual reality view. There is multitude of other applications of an embedded display; any use of contact lens based embedded display will present the same limitation described above.

To overcome the aforementioned problem, image on the embedded display may be shown at a center position in order to make an entire image in focus. In order to display the image at the center position, the image needs to appear as being far away from a user. However, this approach presents number of limitations, such as: 1) amount of information and image size displayed in focus at "far away" is minimal, and 2) there is no peripheral view available which further limits usefulness of such an approach.

Hence, to render the embedded, contact lens display, useful and practical for a human, it is critically important that the above described limitation is transcended.

SUMMARY

The solution propounded in the present invention is to partly or completely shift responsibility of bringing different parts of the image displayed into focus, from the eyes to the display. To be in focus, the section of an image must be situated in front of the retina of the eye, at the center of the display. The image has to shift on the display, so as to position the section of an image of interest, at the center of the display bringing it, from peripheral view, into the focus.

In one embodiment, a contact lens is provided. The contact lens includes a contact lens substrate and an embedded display. The embedded display may form a part of the contact lens substrate. The embedded display component may comprise a single Fresnel lens or plurality of Fresnel micro lenses or other types micro lenses; a single or plurality of micro lenses that are configured to regulate projection of light onto a retina of an eye for bringing at least a part of an image being displayed on the embedded display into focus. Such lenses form focusing component of an embedded display component.

The embedded display regulates the projection of the light by shifting the at least a part of the image to a first position on the embedded display, depending on a shift factor determined with respect to a frame of reference.

Further, the frame of reference is one of a two-dimensional frame of reference or a three-dimensional frame of reference.

The contact lens system further comprises one or more embedded (onboard) or offboard processors. The one or more processors are configured to track eyes gaze movement and head movement of a wearer of the contact lens and correlate the tracked eyes gaze movement and the head movement with a three-dimensional geometry of real world objects around the wearer of the contact lens, to determine the delta in eye gaze vector within three-dimensional frame of reference; and track changes in eyes gaze direction of the wearer of the contact lens and correlate the tracked changes with a two-dimensional geometry of the embedded display to determine the delta in eye gaze vector within two dimensional frame of reference.

The shifting of the at least a part of the image is triggered in an event of a change in eyes gaze direction or in an event of reception of an external signal from the wearer of the contact lens or internal signal, such as change of eye's focus.

The contact lens further may comprise one or more orientation sensors embedded in the contact lens substrate to determine the change in eyes gaze direction. The contact lens further may comprise a depth sensor embedded in the contact lens substrate, wherein the change in eyes gaze direction is determined based on depth images captured by the depth sensor.

The contact lens may further comprise a communication device embedded in the contact lens substrate, the communication device configured to communicate with one or more external communication device or with another paired contact lens.

The contact lens system may comprise head mounted sub-system that comprises depth sensor.

In an embodiment, a contact lens is provided. The contact lens may comprise a contact lens substrate, an embedded display, a depth capturing sensor, and a processor. The embedded display forms a part of the contact lens substrate. The depth capturing sensor captures depth information of an environment in front of a user and provides associated output. The processor tracks changes in the environment using the output and determines and recognizes objects in the environment using the tracked changes.

The depth capturing sensor comprises monochrome CMOS sensor, CCD sensor, Passive Infrared Sensor, EM-CCD sensor, and capacitance-detection type of infrared sensor or any other suitable depth sensing component. The depth capturing sensor may be a color CMOS or CCD sensor.

The depth capturing sensor captures depth information based on distance measured or based on correlation of plurality of 2D colored images of the environment of the user.

In another embodiment, a contact lens is provided which comprises a contact lens substrate, an embedded display, and a communication module. The embedded display forms a part of the contact lens substrate. The communication module is embedded with the contact lens substrate. The communication module is configured to:

a. request information from remotely available source;

b. receive response from remotely available service providers; and c. obtain at least one of location information, instructions, or eye gaze direction from an off-board eye position tracking sub-system.

The communication module comprises a wireless antenna. The wireless antenna communicates with an external communication transponder or with another "paired" contact lens.

In another embodiment, a contact lens is provided which comprises a contact lens substrate, rear facing (eye facing) image capture sensor optionally coupled with the rear facing emitter of an invisible light, for example IR emitter. In present embodiment, the rear facing image sensing component is used to identify and track changes in eye's focal length, identify change in eye's focus.

In one embodiment, information about change of focus may be used to signal the contact lens system the need to change FoR or to start or to stop tracking changes relative to base reference point.

BRIEF DESCRIPTION OF DRAWINGS

The features which are believed to be characteristic of the present disclosure, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this disclosure will now be described by way of example in association with the accompanying drawings in which:

FIG. 1 illustrates a contact lens system with optional association with a head mounted device, in accordance with an embodiment of the present disclosure;

FIGS. 2-7 are flow diagrams illustrating exemplary operation of the contact lens system, as that of FIG. 1, in accordance with an embodiment of the present disclosure;

FIG. 9 illustrates another block diagram of a contact lens, in accordance with an embodiment of the present disclosure.

FIG. 10 is a flow diagram illustrating exemplary operation of the contact lens system, as that of FIG. 1, in accordance with an embodiment of the present disclosure;

DETAILED DESCRIPTION

Figure 8:
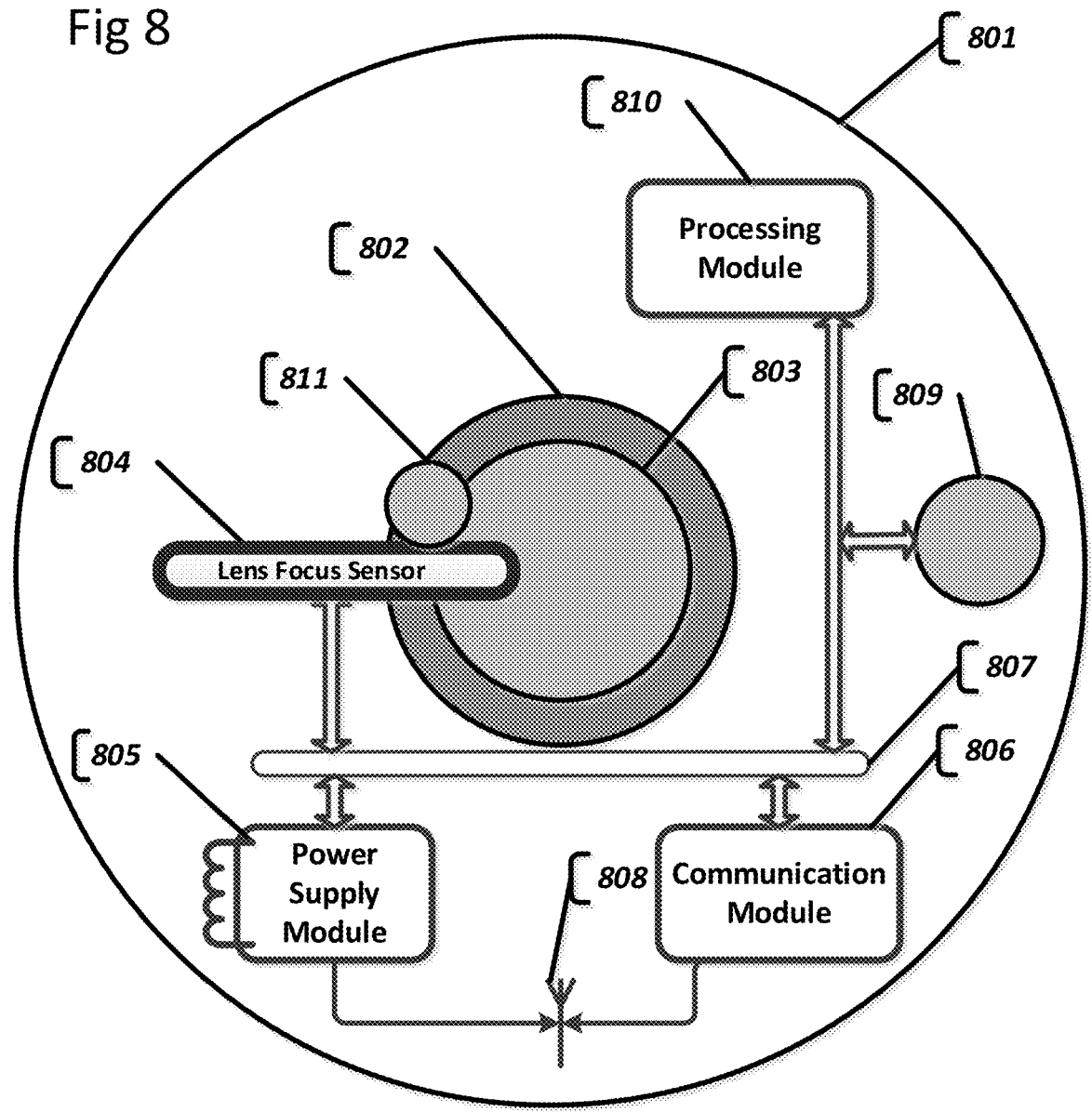
FIG. 8 illustrates a block diagram of a contact lens, in accordance with another embodiment of the present disclosure.

The terminology used in the present disclosure is for the purpose of describing exemplary embodiments and is not intended to be limiting. The terms "comprises," "comprising," "including," and "having," are inclusive and therefore specify the presence of stated features, operations, elements, and/or components, but do not exclude the presence other features, operations, elements, and/or components thereof. The method steps and processes described in the present disclosure are not to be construed as necessarily requiring their performance in the particular order illustrated, unless specifically identified as an order of performance.

In an event an element is referred to as being "on", "engaged to", "connected to" or "coupled to" another element, it may be directly on, engaged, connected or coupled to the other element, or intervening elements may be present. On the contrary, in an event an element is referred to as being "directly on," "directly engaged to", "directly connected to" or "directly coupled to" another element, there may be no intervening elements present. Other words used to describe the relationship between elements should be interpreted in a like fashion. Further, the term "and/or" includes any and all combinations of one or more of the associated listed items.

Although the terms first, second, third, etc. may be used herein to describe various elements, components, regions, and/or sections, these elements, components, regions, and/or sections should not be limited by these terms. These terms may be only used to distinguish one element, component, region, or section from another region, layer or section. Terms such as "first," "second," and other numerical terms when used herein do not imply a sequence or order unless clearly indicated by the context.

For the purpose of description of the present disclosure, the term "embedded display" may be used interchangeably with the terms "integrated display" and "embedded display component" and "embedded display module".

For the purpose of description of the present disclosure, the term "processor" may be used interchangeably with the terms "processor component" and "processor module".

For the purpose of description of the present disclosure, the term "eye position" may be used interchangeably with one of the terms from: "eyes gaze orientation", "eyes orientation", "eyes direction", "eyes directional orientation", "eyes vector", or "gaze vector".

For the purposes of description of the present disclosure, the term "shift factor" may be used interchangeably with the terms "shift adjustment factor" and "display adjustment factor". The "shift factor" refers to the directional vector and extent of the shift of an image on the display.

For the purposes of description of the present disclosure, the term Frame of Reference (FoR) refers to an observer centric coordinate system. A 2D Frame of Reference refers to a two dimensional geometry the embedded display and is defined by x and y axis; a 3D Frame of Reference refers to real world three dimensional geometry and is defined by x, y and z axis.

For the purposes of the present disclosure, the terms "base reference" and "base point reference" and "zero point reference" and "anchor point" refer to the relative or absolute position either in 2D FoR or 3D FoR. "anchor point" or "base reference" may refer to the position of the eye and corresponding image disposition on display that can be deemed as the starting point for consequent eye gaze orientation tracking and corresponding image position adjustments on display. It may also refer, in 3D FoR, to a particular coordinate in space external to the user.

In one non-limiting, exemplary embodiment, once, zero point reference is determined, tracking of the eye's position begins for the current image overlaid onto the display. With every shift in the eye's position, the image overlay may be recomputed accordingly so that the part of the image sought by the eye is displayed at the center of the display, in front of the eye's retina, and therefore displayed in focus.

In one non-limiting, exemplary embodiment, "base point reference" may be selected by the user with any detectable signal, with triggering action.

In one non-limiting, exemplary embodiment, the user may trigger taking base point reference by clapping his hands.

In one non-limiting, exemplary embodiment, the user may trigger taking base point reference by eye blink.

In one non-limiting, exemplary embodiment, the user may trigger taking base point reference by predefined signal that would be captured by image capture device and processed to identify the signal; for example certain sequence and form of hand gestures.

By tracking changes in focus of the eye, the system may determine whether the eye is focused on the image superimposed on display or the real world objects in front of the eye.

In one non-limiting, exemplary embodiment, the user may trigger taking base point reference by tracking focus of the eye, in real-time, to determine whether the eye focusing on the objects at a distance or it is focused on the image on display. This method may be used to switch between Frame of References and for registering anchor point at the same time.

Variety of other detectors of a switch in gaze between outside real object and overlaid image are possible. Methods given above are exemplary only and should not be taken as being limiting to the scope of the invention.

In one non-limiting, exemplary embodiment, the system may predefine or dynamically determine where base point reference should be and when the tacking, against said point reference, should stop. The system may stop tracking position of the eye and correlate changes of eye's vector to the image disposition on display at stop point. Stop point may be signaled with hand gestures, voice or other signals. Stop signal may be signaled by change of focus from image on display to the real world objects in front of the user. There may be variety of other ways to detect stop point. For 2D FoR, once stop signal is identified, the image may on display may return to its original disposition on display; regardless of the position of the eye.

Referring to FIG. 1, a contact lens 100 of the present disclosure may comprise an active contact lens substrate 101 with an embedded display 105. The embedded display 105 may be arranged at the center of the contact lens substrate 101, so that the embedded display 105 maybe positioned directly opposite to a cornea of a user's eye.

In an example, the embedded display 105 may be a transparent display, a semi-transparent display, or a non-transparent display. The embedded display 105 may be embedded within or on the contact lens substrate 101.

In an example the embedded display 105 may have a round shape. Alternatively, the embedded display 105 may have a square shape. However, the shape of the embedded display is not limited to above mentioned shapes and the embedded display 105 may also possess other suitable shape. In an example, the embedded display 105 may be implemented as a variation of Liquid crystal display (LCD), or a Light Emitting Diode (LED) display. For example, GaN (Gallium Nitride) based LED. However, the embedded display 105 is not limited to the LCD or the LED display, and may also be implemented with variety of other micro or nano scaled light emitting components.

Generally, the human eye cannot focus on an object which is closer than few centimeters from the eye. Regular display positioned immediately in front of the cornea of the eye does not allow the eye to perceive an image in clear and sharp focus due to natural, anatomical limitations of the human eye. This is a major difficulty implementing active contact lens with transparent, semi-transparent or non-transparent display built into the lens. There are several solutions to the problem at hand.

In an embodiment, the embedded display 105 component may comprise different types of microlenses. For example, a layer of an array of the micro lenses is positioned over the embedded display 105 in such a way that each of the micro lenses correspond to one or more pixels on the embedded display 105. The layer of the array of the microlenses is positioned facing directly a cornea of an eye. Micro lenses create collimated beam of light directly projected onto the retina of the eye. Rays of light, representing an image, are arranged collinearly or nearly collinearly and that leads to an image perceived by the perceiving subject as being far sourced and "being in focus". Some portions (off the center) of an image may be off focus and may be seen with peripheral vision.

In one non-limiting, exemplary embodiment, a display 105 may be coupled with a variation of the Fresnel like micro lenses or lens array that focuses an image directly onto the retina of the eye. The Fresnel lens is a diffractive focusing component that enables decent quality focus with a very thin optical component.

In one non-limiting, exemplary embodiment, a contact lens system may utilize a single lens focusing entire display into the eye.

In one non-limiting, exemplary embodiment, a display 105 may be coupled with a variation of thin variable focus lens with a refractive index that may be changed electronically with an electric signal, such as a liquid crystal lens. Variety of other methods and technologies are possible for displaying information in focus at a close distance.

It should be appreciated that there are variety of other strategies and techniques possible to produce projections of an image, onto retina of the eye, so that it is perceived as being in focus. Above mentioned methods are exemplary and in no way should be conceived of as being limiting the scope of the invention.

In an embodiment, the contact lens 100 of the present disclosure may further comprise an integrated power supply module 107. The power supply module 107 may provide electric power to the contact lens 100. The power supply module 107 may derive electric power from an energy transfer antenna 102. The energy transfer antenna 102 may receive power from a Radio Frequency (RF) power source that is located in proximity to the energy transfer antenna 102. The power supply module 107 may include a capacitor unit, a battery or an accumulator unit to supply electricity from a local storage when an external power delivery is not available.

In another embodiment, the power supply module 107 may derive electric power from an onboard, integrated solar panel, radio frequency power source, electrochemical power source, temperature power source, or a mechanically derived power source (e.g., MEMs system).

In another embodiment, the electric power may also be gained from several sensors that are integrated into the contact lens substrate 101. For example, an image capture sensor, which is reactive to light, may be configured to generate electricity in a passive mode. Further, heat sensors, conductivity, magnetic sensors and other electromechanical sensors may also be utilized. In an embodiment, the contact lens substrate 101 may incorporate an onboard integrated communication module 106. The communication module 106 may include a wireless antenna 102. The wireless antenna 102 may be arranged to communicate with an external communication transponder or to communicate with another "paired" contact lens. Communication module may be used for transmission of variety of other data or parameters or commands.

The communication module 106 may be used to a) request information from remotely available source, b) receive response from remotely available service providers, and c) get location information, instructions, and/or eye gaze direction from an off-board eye position tracking sub-system. In another embodiment, the communication module 106 may receive head directions from an off-board location determination sub-system that may be located remotely but in close vicinity of a user's contact lens. The communication module 106 may send to a server, image information collected by an image capturing device integrated into the contact lens substrate 101. In another embodiment, the communication module 106 may transmit/receive information from another contact lens being paired with the contact lens 100 of the present disclosure.

In an embodiment, the communication module 106 may comprise various electronic components, such as a transceiver coupled with a wireless antenna 102. The communication module 106 may include onboard memory and a sub-processor along with other miniaturized electronic components, such as micro or nano scaled electronics or MEMS based systems and other types of miniaturized electronics.

In an embodiment the contact lens 100 may comprise at least one processor module 103. In an embodiment, at least processor module 103 may also be included by a head mounted corpus 109. The processor module 103 of the head mounted corpus 109 may communicate with the contact lens 100 via a communication module 110 and the communication module 106.

In an embodiment, the processor module 103 may initiate request to be sent to an external server, via the communication module 106 and/or the communication module 110.

The processor module 103 may compute proper overlay of information onto the embedded display 105 in order to enable displaying the information at the center of the embedded display 105, thereby rendering relevant part of an image in focus.

In an embodiment, the processor module 103, may provide either hardware only or both hardware and software solutions to determine a Frame of Reference (FoR). The processor module 103 may track eye shifts and optionally head position shifts and may further compute proper disposition of an image on the embedded display 105.

In one non-limiting, exemplary embodiment, the processor module 103 may determine Frame of Reference (FoR) and may compute proper shift of an image on the embedded display 105 based on either two-dimensional FoR (shift only based on eye shift) or based on three-dimensional FoR. In the three-dimensional (3D) FoR head position as well as eye position are tracked and correlated with the 3D geometry around the user. Based on the tracked positions, a location on the display of an overlaid image is computed in order to bring the image in focus.

In one non-limiting, exemplary embodiment, 2D FoR, the processor module 103 may take a number of inputs, from a variable number of sources, for example, the inputs may be:
  a. current directional orientation of an eye of a user or delta in orientation relative to previous value or both, received from an integrated onboard orientation module 104 or from an external eye orientation module 111 or eye tracking module 112;
  b. current image disposition on the embedded display 105; or
  c. an image handle;
  d. information identifying anchor point Further the processor module 103 may compute a shift factor; based on which an image is shifted on the embedded display 105. In order to determine shift factor in 2D FoR, change in the eye's gaze direction and an extent of the change is computed. The processor module 103 may apply the shift factor to the image to compute image disposition on the display. In an embodiment, matrices manipulation is one of the most optimal ways to compute disposition of the image on display. However, other methods of computation are possible, for example algebraic equations may be used and other methods. Consequently, the image is displayed with new computed disposition.

Furthermore, extent of the shift depends on and correlates with the level of eye's movement in certain proportion. The correlation between eye movement and corresponding extent of an image disposition shift may be preconfigured in the contact lens system or may be dynamically determined and adjusted based by variety of factors. For example, user of the contact lens may calibrate his preferred level of correlation at the beginning of use of the contact lens system, the correlation may be configured at the time of use of the contact lens with variety of gestures preconfigured to control contact lens system. The system may use other dynamic factors to adjust correlation.

In one non-limiting, exemplary embodiment, shift factor may be computed relative to the base point reference or relative.

It should be understood that the description of the method of the shift of image disposition on display is provided here by way of example and in no way should be thought of as limiting to the scope of the invention. The term of "shift factor" as described in present disclosure is used by way of an example, to demonstrate how image disposition on display may be computed; the description provided here is by way of example and should not be taken to be limiting to the scope of the invention; other terms and methodologies may be used to describe the similar function.

In one non-limiting, exemplary embodiment, in 3D FoR, the processor module 103 may take a number of inputs, from a variable number of sources, for example, the inputs may be:

current directional orientation of the eye or delta in orientation relative to previous value or both, received from the integrated onboard orientation module 104 or from the external orientation module 112. In an event, the orientation module 104 tracks orientation of the eye in 3D, then there is no additional head tracking is required. Otherwise, in order to determine actual orientation of the eye in 3D, a 3D measuring orientation sensor is implemented;

optionally, current directional orientation of the head or delta in directional orientation of the head, received from a head tracking module 113. In an event, the orientation module 103 and the external orientation module 112 track only 2D orientation of the eye, an additional head position tracking is required in order to provide absolute shift of eye gaze vector relative to a 3D geometry;
 a. current image disposition on the embedded display 105; and
 b. an image handle.
 c. information identifying anchor point.

In order to determine the shift factor in 3D FoR, 3D geometry around the user and change in eye gaze position relative to 3D geometry are tracked. The shift factor is applied to an image to compute an image disposition on the embedded display 105. In an embodiment, matrices manipulation is one of the most optimal ways to compute the disposition of the image on the embedded display 105. However, other methods of computation may be used. Further, the image is superimposed on display at new computed disposition.

In one non-limiting, exemplary embodiment, for an active process of calculating the shift factor, embedded display 105 calibration parameters, resolution of the embedded display 105, optical strength of the Fresnel like lens, size of an image and/or other optical parameters of the embedded display 105 are considered.

In one non-limiting, exemplary embodiment, a passive process may respond to users trigger action and may perform shifting of the image on the embedded display 105 without having user repositioning his/her eyes.

Processor module 103 may include a processor which may be a general purpose processor (CPU) or a processing unit capable of processing computer instructions. The processor module 103 may further include operating RAM memory, ROM memory, EPROM memory, EEPROM or DROM memory, and non-volatile RAM (NVRAM) memory, or any other kind of operating memory. In one embodiment, the processor module 103 may also include permanent memory. In an embodiment, the processor module 103 may include miniaturized Micro-Electro-Mechanical Systems (MEMS) based or nano scaled sub-systems.

In one non-limiting, exemplary embodiment, the processor module 103 may be built with carbon nanotube based crossbar memory, for example Nano-RAM or memristor technology. Alternatively, any other memory device based on spintronics principle may also be utilized for building the memory. In another example, MRAM based on GMR and TMR effects may be utilized for constructing the memory. Memory construction is not limited to aforementioned technologies and any other technologies, such as micro or nono-electronics components, may be used.

The processor module 103 may communicate with contact lens and remotely available services. The processor module 103 may output visual information to the embedded display device 105 and audio information to audio output device. Image data coupled with audio signal provides a better augmented reality experience.

The processor module 103 may be integrated with the contact lens 100 or may be an external sibling device that has wireless connectivity to the contact lens 100. The system may combine the two processors, playing similar or different roles in the system, where first processor is integrated to of the contact lens 100 and the second processor is situated remotely on a sibling device external to the contact lens 100.

It should be understood that the structural and functional description of the processor module 103 or other electronic components of the system provided here are exemplary and illustrative and should not be conceived as being limiting to the scope of the invention. Any miniaturized information processing component(s) may be utilized for the processing module 103.

In one non-limiting, exemplary embodiment, the active contact lens 100 may be equipped with an onboard eye orientation module 104. Eye orientation module 104 may be used to determine directional orientation of the eye. Eye position changes relative to constant position of the head. The eye position may be measured in two dimensions, according to 2D FoR.

In one non-limiting, exemplary embodiment, the active contact lens 100 may be equipped with an onboard eye orientation module 104. The eye orientation module 104 may track gaze direction in 3D that combines direction of the eye and the head. The gaze direction is measured in three dimensions, according to 3D FoR.

Further, the smart contact lens 100 may comprise an embedded directional orientation sensor module 104. The direction orientation sensors may include compass, gyroscope, tilt sensor and accelerator or any other sensor capable of determining directional orientation or capable of tracking changes in directional orientation. The direction orientation sensor module 104 may include Inertial Measurement Unit (IMU) or Attitude Heading Reference System (AHRS). Sensors may be implemented with Micro-Electro-Mechanical Systems (MEMS) technology. Further, sensors may be implemented as nono or micro scaled sensors.

In one non-limiting, exemplary embodiment, the direction orientation sensor module 104 may contain multi-dimensional gyroscope, tilt sensor and/or optionally accelerator. Such orientation sensor module 104 may accurately determine and track the direction of the eye's gaze in two dimensions; measurements of the direction of the eye's gaze may be made relative to the base point reference in 2D FoR of the image superimposed. In one embodiment, head movement is disregarded completely and only eye movement is considered for the measurement of direction of the eye's gaze. Here, the focus is on the image superimposed onto the display, for example, text image. With every move of the eye text image is redrawn so that next appropriate portion of text image comes into focus.

In one non-limiting, exemplary embodiment, the eye orientation sensor module 104 may contain combination of compass, multi-dimensional gyroscope, tilt sensor and optionally accelerator. Such eye orientation sensor module 104 may accurately determine and track the direction of the eye's gaze in three dimensions; measurements of the direction of the eye's gaze may be made relative to the base point reference in 3D FoR of the image superimposed. In one example, both eye movement and head movement are considered for measuring the direction of the eye's gaze. Annotations of the objects in front of the user may be superimposed onto objects being looked at and position of the annotation information on the screen is being recomputed to bring parts of the image into focus.

In one non-limiting, exemplary embodiment, the eye orientation module 104 may be remotely available and may be embedded into a paired sibling device such as wearable glasses. Such remote eye orientation module 104 may observe eye movements and measure the extent and direction of eye moves.

In one non-limiting, exemplary embodiment, the system 100 may include an orientation module 111 installed on a head mounting corpus 109. In the present embodiment, the orientation module 111 may be equipped with an eye position tracking module 112 and head position tracking module 113.

In one non-limiting, exemplary embodiment, the eye position tracking module 112 may be comprise at least one image capture device. Further, the position tracking module 112 may optionally include a light emitter, for example a radio frequency (RF) emitter. The eye position tracking module 112 may include the processing unit that analyzes sequence of images, recognizes position of the iris/pupil of the eye and tracks the changes in the eye's position.

It should be understood that there are various techniques and methods available for tracking eye position. Above described is illustrative in nature and should not be conceived to be limiting to the scope of the invention.

In one non-limiting, exemplary embodiment, the eye position tracking module 112 may be used for managing position of superimposed image in 2D FoR relative to a base reference point. In the present embodiment, head position is not considered and only eye position is considered for managing position of the superimposed image.

In one non-limiting, exemplary embodiment, remote or head mounted orientation module 111 may comprise head position tracking module 113. Head mounted orientation module 111 may comprise compass, gyroscope, accelerator and other direction/orientation sensing components.

In one non-limiting, exemplary embodiment, combination of the eye position tracking module 112 and the head position tracking module 113 may be used for managing position of superimposed image in 3D FoR relative to the base reference point. In the present embodiment, both head position as well as position of the eye are considered while computing shift in the image position on the display.

In one non-limiting, exemplary embodiment, the system may track outward geometry with either image capture or depth capture device. Eye position change in 3FoR may be determined by correlating change in depth images with, for example, SIFT (scale invariant feature transform) to identify the head direction change in as well as eye movement within the same time window. The depth image capture device may be integrated into the contact lens or may be situated on the head mounted device. If the depth capture device is onboard of contact lens, then SIFT can determine absolute orientation change in 3D without considering head position changes.

It should be noted that either integrated into the said contact lens orientation module may be used in isolation or head mounted orientation module may be used in isolation or both may be used.

In one non-limiting, exemplary embodiment, the active contact lens 100 may be arranged with one or more RF antennas 102. RF antennas may be used by communication module 106 for sending and receiving data. RF antenna may also be used by the power supply module to generate electric energy wirelessly.

In FIG. 1, section 108 depicts area on the embedded display where data may be in clear focus. This area of display is the target area for refocus based on eye's and optionally head's movements.

In FIG. 2, a one possible process flow of proposed system is depicted. The process detects the need to transition from one FoR to another and switches the system accordingly to an alternative mode of operation. The process starts at step 201 with, for example, turning the contact lenses to an 'ON' state. At step 202, a mode of operation of the system is determined. At step 202, optionally, a user may switch the system into one of the modes, otherwise the system may auto-detect the required mode and switch to that mode or the system may default to an initial preconfigured mode. Possible modes are: passive mode 203 (eye does not move—image moves 205) and active mode 204—image shift on the display is computed proportionally to either eye direction change or head position change or both depending on Frame Of Reference and base point reference. The process loops at step 202, constantly monitoring and determining the mode of operation the system is in. The process may change the mode (Frame Of Reference) at step 202. Various methods may be utilized to switch between the 2D FoR or 3D FoR. For example, eye's focus may be monitored, with various techniques, namely change in crystalline lens shape may indicate change in focus.

In one non-limiting, exemplary embodiment, predefined hand gestures or sounds or an eye blink or sharp movement of the eye to the side or to up or down, other signaling techniques may signal and trigger switch to another mode.

The predefined hand gestures or sounds or other signaling techniques may signal and trigger shift of an image on display to bring parts of an image of interest into focus. These signals may be used to determine the direction and extent of the shift of the image on display.

In one non-limiting, exemplary embodiment, interest in or intent of switching from looking at real world objects to looking at superimposed image information may be identified by monitoring brain activity and brain state with variety of methods measuring brain activity and state, for example, using invasive or non-invasive BMIs (Brain Computer Interface).

Noninvasive computer interface may for example comprise head-mounted device arranged to monitor and measure certain brain waves, called alpha waves, with electroencephalogram (EEG) apparatus. Such an apparatus may be used to detect variety of brain activity, volition, voluntary intentions or visual stimuli. Such a device may track, filter and detect the intention to change focus and focus on the superimposed image or vise-versa, flip from focus on superimposed image to the view in front of the user. Furthermore, such BMI device may be used to also determine the extent of the shift and direction of the shift of an image required.

In one embodiment, BMI may be used to flip flop between 2D FoR and 3D FoR as well as take zero reference point and control and manage the shift of an image on display to bring an image into focus.

Active mode may be implemented based on 2D FoR represented by change of orientation of the eye (direction of the eye) 206. Alternatively, active mode may be implemented based on 3D FoR represented by both change of orientation of the eye and head 207. For 3D FoR, the system may utilize on absolute orientation information derived from, an embedded into contact lens, 3D orientation module. Alternatively, the system may utilize a combination of relative orientation of the eye information and head movement tracking information.

At step 208, display adjustment factor (shift factor) is computed based on several factors, such as display parameters and focusing component (Fresnel lens) parameters, in an active mode, first position of the eye and last position of the eye, computed relative to 2D FoR (eye shift only) or 3D FoR (accounting for head position change), delta in position of the eye may be computed as vector value to indicate both angular shift and extent of the shift. For passive mode, the adjustment factor may be computed based on the predefined shift parameters or dynamically set shift parameter; shift parameter may postulate speed and/or interval of shift of an image on the display. For active mode, the shift is computed for the delta in the eye's or head's position.

Subsequently, position of an image on display is computed at step 209. Here, per pixel image matrix is computed and consequently mage is superimposed onto the display at step 210. Step 211 signifies an end of the process, for example step 211, the device may now be turned to an "OFF" state. The process works in a loop, with every change in eye's position recompilation of image's disposition on display follows. Consequently, recomputed pixel values are updated on the embedded display.

FIG. 3 depicts a detailed flow diagram for the 2D FoR variation of the active mode process. The process starts at step 301, for example, by turning the contact lens system to an "ON" state. At step 305, base reference is determined and used as the starting position to determine the eye's gaze shift at step 302. At step 303, the directional change in the eye's position is determined. At step 304, the system computes shift adjustment factor based on base reference and delta in the eye's direction relative to the base reference point. Shift adjustment factor may be represented as vector value indicating angle and extent of the shift required in the disposition of an image. Shift adjustment factor may be represented as an angle measure and value measure, whereas angle indicates angle (direction) of the shift and value measure indicates extent of the shift in the direction of the angle. It should be understood that shift factor, also known as shift adjustment factor may be expressed in variety of ways and given here suggestions are for illustration only and in no way are limiting to the scope of the invention. Furthermore, at step 307 the system computes per pixel image matrix based on the shift adjustment factor. There are variety of ways the computation may be achieved, for example with matrix mathematics, trigonometric models and so on. Further, the computed image is output to the display at step 308, so that sought part of image is displayed at the center and is situated at the center of the eye, against eye's retina and thus new portion of an image comes into focus. At the same time the portion of the image that has been in focus previously shifts to the peripheral zone of the display. This process is repeated in a loop 306. Step 309 signifies end of the process and may be triggered, for example by user command, by switching to another Frame of Reference. Step 309 may be triggered by an eye changing focus from the overlaid image to the outside view.

It should be understood, above described process flow is provided here in a way of an example and is not limiting to the scope of the invention. There are many ways to implement computation of the image position on display for example, some of which are not described herein.

FIG. 4 depicts a detailed flow diagram for the 3D FoR variation of the active mode process. The process starts at 401, for example, by turning the contact lens system to an "ON" state. At step 409, Frame Of Reference is determined to be 3D FoR.

Furthermore at step 403 eye gaze direction is determined. At step 404, direction of the head is determined. Steps 403 and 404 may be combined and direction of the eyes' gaze may be determined by the embedded into the contact lens orientation module. Whereas, orientation module may determine absolute or relative direction of the eye's directional vector. The measurement may be expressed in various ways, for example, as linear vector, rotation matrices, Euler angles, trigonometric angle measure or any other mathematical construct. At step 402, directional orientation of gaze is determined, relative to 3D FoR.

Furthermore, at step 405, display adjustment factor is computed based on combined delta in the head and eye's gaze direction relative to the base reference position.

In one non-limiting, exemplary embodiment the display adjustment factor is computed based on the measurements from any combination of orientation determination and gaze tracking mechanisms.

In one non-limiting, exemplary embodiment the display adjustment factor is computed based on the difference in estimated direction of the eye. Estimation of direction is performed by analyzing color or depth images taken by image or depth capture device integrated into the contact lens. Also, various integrated range finders may be used to estimate depth/distance. Estimation of eye gaze direction may be performed by utilizing Similarity Invariant Descriptors (SID), for example, Scale-Invariant Feature Transform (SIFT) or Gradient Location and Orientation Histogram (GLOH) algorithms. These algorithms may be applied to juxtapose and correlate the two images that are taken at different times, to detect differences; and from the delta reverse compute gaze direction and change of the gaze overtime.

Further at step 406, compute per pixel display matrix, so that image shift is reflective of the shift in the eye's position. Computation of the latest display matrix may be carried out by the system's processing module; processing module may be integrated into the contact lenses or alternatively may be disposed on a remote device. At step 407, refresh screen and display recomputed image so that sought portion of an image comes into focus at the center of the display. This process may be executed in a loop. The process stops at step 408 with either predefined user triggered action or refocus or switch to another Frame of Reference or any with some other signal.

FIG. 5, FIG. 6 and FIG. 7 show sequential "walk" of the eye's gaze through the overlaid image; according to 2D FoR. However, similar technique may be used for 3D FoR.

FIG. 5 depicts an active contact lens 501 with an embedded onboard display 502. Display 502 may be of any shape. In one embodiment, display may be round. In an alternate embodiment, display may be square or rectangular, etc. Section 503 shows portion of display where image will be seen in sharp focus. In FIG. 5, base reference is middle of the screen and 504 arrow points to location on the display where some data is displayed. The data section pointed to by 504 arrow is of interest to the user. First, the system takes the base reference, that is, the system determines the position of the eye and current disposition of the image on display. Secondly, with the shift of an eye, as per FIG. 6, the system of an active contact lens 601 correspondingly shifts an image to make it visible on display 602 in focus at section of display 603. FIG. 6 depicts first image adjustment after base reference is determined. Arrow 604 points to the section of superimposed image which is of interest to the user afterwards, as registered by the eye tracking subsystem. The system accordingly adjusts image location on the screen as per exemplary FIG. 7, active contact lens 701, containing display 702 and a shifted image where sought portion of an image data is at the center of the lens at 703 and thus in focus. FIG. 7 depicts second image adjustment after base reference is determined. Once the data ingestion is finished the image on the screen may be refreshed with new data and base reference may be taken again.

Thus, the eyes are presented with the wide peripheral vision, and consequent eye movements bring different parts of an image into focus for complete data ingestion. In the present embodiment, the system shifts the image based on the eye movement shift, where eye is concentrating on the image overlaid (2D FoR). For 3D FoR, the schema is similar but the 3D FoR is taken into consideration, that is, when tracking changes in the eye direction the system tracks direction relative to 3D Geometry of real world around the user so that images superimposed onto real world view on and have association to 3D real world geometry will shift on display according to 3D shift in the eye direction.

In one embodiment, the responsibility for focus shift may be moved to the display altogether. For example, while user is reading a text overplayed on the embedded display, the text image can be moved relative to the eye without the movement of the eye (stable eye—shifting image); in present disclosure it is also called passive mode.

In one embodiment, predefined trigger that signals that the shift of an overplayed image needs to take place. Example predefined trigger may be hand signal, or sound/command from the user or pressing of the button on the smart phone, eye focus change, etc. In one embodiment, a hand gestures may be used to identify the vector and extent of the shift required. For example, the hand gesture may be movement of a hand to the right by 10 cm triggers shift of an image to the right by certain proportional measure.

In one embodiment, a time frequency may be defined when the image data shifts on the screen may take place, the image moves accordingly.

The geometry of an image data shift and sequencing of shift may also be predefined or triggered by an external action of the user.

In one embodiment, the system may determine current (2D vs 3D) FoR and hence mode according to which image overlay is computed on display, by actively identifying eye's focus and tracking changes in the eye's accommodation reflex and refocus.

The process of accommodation is the process by which an eye changes the shape of the elastic crystalline lens in the eye, thereby enabling an eye to focus on an object. Whenever the distance to the object changes an eye needs to accommodate to change optics of the crystalline lens (optical power of the eye). The optical power of a healthy (young) human eye is about 13 diopters, which enables an eye to change focus from infinite distance to about 7 cm from the eye approximately in 350 milliseconds. There is one kind of muscles that control the shape of the crystalline lens: ciliary muscles are attached to the lens edges by zonules (ligament fibers that may be stretched). Whenever, zonular fibers relax, the lens becomes more spherical, adjusting to a shorter distance focus and vice versa, relaxation of the ciliary muscle has opposite effect on zonular fibers and lens flattens, leading to the increase in focal distance and refocusing the lens to a longer range.

Mechanism disclosed in the present invention monitors and identifies the focal length of the crystalline lens and changes of the focal length.

To track focus of the lens, corresponding focal distance and changes thereof, a specialized sensor integrated into the contact lens facing cornea of the eye is provided. The sensor may be a variety of electromagnetic sensors designed to be sensitive to visible or non-visible spectrum of light.

Furthermore, the system may optionally, correlate extent of the accommodation reflex and refocus with the depth image information. Whereas depth information may be derived from variety of depth image sensors, range finders or may be computed passively by 2D image analysis. Information about change in gaze direction may be coupled with the change in depth map information to compute the expected level of accommodation and corresponding expected focus for the current depth (distance of view). Expected focus may be measured and represented in variety of ways. For example, it can be measured in Diopters or meters or may be described by the shape of crystalline lens at any given time or distance to the object that should be in focus under current shape of crystalline lens. Thus, if the depth of an image directly in front of the eye is 10 meters (distance to an object being looked at), then the eye should accommodate crystalline lens accordingly to focus at 10 meters. When the system detects that crystalline lens does not accommodate for 10 meters of focal depth; it means that the eye is focused on something else, for example image on display; assuming image on display requires different focal depth then the real object at a distance.

Furthermore, the system may determine whether current focus corresponds to the distance to the object in front of the eye. Change in focus relative to the required focus for current Frame of Reference may serve as the signal indicating that the system needs to switch from the 2D FoR to 3D FoR or vice versa.

FIG. 8 depicts a contact lens 801 with an integrated eye focus detection sensor (eye crystalline lens focus sensor) 804.

In one embodiment, the eye focus detection sensor may be embedded into the middle of the contact lens substrate and positioned either on the side from cornea of the eye or overlapping cornea 802 or may be positioned over the iris/pupil of the eye. The reference numeral 802 references cornea section of the eye.

In one embodiment, the eye focus detection sensor may be positioned on and be integrated with optionally embedded display 803 into the contact lens substrate.

In one embodiment, the eye focus detection sensor may be embedded into the bottom of the contact lens substrate and be positioned either on the side from the cornea or overlapping cornea.

The eye focus detection sensor may be positioned under such an angle so as to be under certain angle relative to the crystalline lens of the eye.

In one embodiment, the eye focus detection sensor 804 may be implemented as specialized variation of CMOS sensor.

Also, the eye focus detection sensor 804 may be implemented as specialized variation of monochrome CMOS sensor optionally coupled with IR emitter (for example, light-emitting diodes—LEDs) 811 embedded into the contact lens, so that the IR emitter may hit the crystalline lens with IR light to be reflected on CMOS sensor. The form/shape image of the lens will be reflected into the CMOS sensor.

The eye focus detection sensor 804 may be implemented as an EM-CCD sensor. Further, the eye focus detection sensor 804 may be implemented as CIS (Contact Image Sensor). Generally, CISs are inferior to CCDs in terms of output image quality produced. However, given CISs uses many times less electric power, a miniaturized CIS sensor may be a good fit for tracking changes in the iris's diameter.

In one embodiment, the eye focus sensor 804 may be implemented with a variation of CCD sensor. Further, the eye focus detection sensor 804 may be implemented as miniaturized HPD (Hybrid photo-detectors). Also, the eye focus detection sensor 804 may be implemented as PIR (Passive Infrared Sensor). This sensor type of sensors detects changes in infrared radiation not requiring visible light.

In one embodiment, the eye focus detection sensor 804 may be implemented as miniaturized capacitance-detection type of infrared sensor utilizing the principle of Golay-cell.

In one embodiment, the eye focus detection may be achieved with an integrated miniaturized Badal Optometer.

It should be understood that any other method and type of sensor may be used to identify and detect changes the shape of the crystalline lens and detect refocus (accommodation). Given here listing of some of the possible technologies that can be used for detection of crystalline lens shape changes are only exemplary and should not be taken to be limiting to the scope of the invention. Multitude of other types of sensors may be employed to function as the eye focus detection sensor 804.

In one non-limiting, exemplary embodiment, the contact lens substrate may integrate power supply module 805 and communication module 806. Contact lens substrate may integrate an RF antenna to support both, communication module 806 needs to send requests and receive responses as well as power supply module 805 to generate electric power from located nearby RF transmitter.

In one embodiment, the contact lens substrate may integrate processor module 810 that may serve as controller for the display and other embedded electro-optical components. Processor module may be arranged execute executable code and run variety of programs and application.

Processor module 810 may comprise a) processor, which may be a general purpose processor (CPU), b) operating RAM memory, ROM memory, EPROM memory, EEPROM or DROM memory, and non-volatile RAM (NVRAM) memory, c) permanent memory.

In one embodiment, the processor module 810 may include various miniaturized Micro-Electro-Mechanical Systems (MEMS) or nano scaled based sub-systems.

The processor module 810 may be built with carbon nanotube based crossbar memory, for example Nano-RAM or memristor technology. Any other memory device based on spintronics principle may also be utilized.

In one embodiment, MRAM based on GMR and TMR effects may be utilized for memory construction.

All electronics components of the contact lens may be implemented as MEMS, micro scaled or nano scaled components.

In one embodiment, the contact lens substrate may optionally integrate image capture device 809. Image capture device may be implemented as miniaturized CMOS or CCD sensor. Alternatively, the image capture device may be implemented with miniaturized graphene image sensor. Graphene based image sensor may be implemented as CMOS sensor. Outward facing image capture device, may be used to collect information about the environment being observed by the user.

In one embodiment, the contact lens substrate may integrate control circuit and electronic communication bus 807. Onboard devices may communicate with each other via electronic communication bus 807. Onboard communication bus and electric circuit of the contact lens may be implemented with graphene and nano wires. Wiring may be implemented with graphene or silver nano-wires or other materials that are conducive to transparency needs of the contact lens.

In one embodiment, the processor module 110 may be arranged to process output from the Lens Focus Sensor 804 and determine changes in the shape of the crystalline lens and determine focus of the lens also known as focal distance. This information may be used for various purposes.

In one embodiment, focus information may be used to present targeted information about the object in focus as an overlay on the embedded display.

In one embodiment, focus information may be used to track and monitor subject's eye gaze and subject's interest.

Present invention describes novel methods and apparatus for 3D object mapping, tracking and recognition.

FIG. 9 describes an apparatus of a novel active contact lens system 901 with an integrated depth image capture sensor enabling to obtain depth information of the environment in front of the user and build 3D model of the environment.

The key components of the system are depth measuring sensor 909 and coupled with it, IR (Infra-Red) emitter 904. Depth measuring sensor 909 may be implemented as monochrome CMOS sensor or CCD sensor.

In one embodiment, IR emitter 904 may be positioned outside of the contact lens substrate. For example, it may be installed on the head mount, smart glasses, etc.

In an embodiment, low voltage, miniaturized IR emitter 904 may be integrated into the contact lens substrate. The IR emitter 904 is aligned with depth measuring sensor.

For the purposes of this invention disclosure, depth image capture sensor may be referred to as depth measuring sensor or depth sensor.

In one embodiment, the depth measuring sensor 909 may be implemented as specialized variation of CMOS sensor.

As a general principle, the IR emitter sends out packets of IR rays. IR light gets reflected from various objects in the vicinity of the user (in front of the user). Reflected light hits depth measuring sensor and induces measurable and quantifiable electro-magnetic changes on the light sensitive surface of the sensor. Values of all the pixels from the sensor are read out and registered. Changes in the state of each pixel are computed. Per each pixel, based on the strength of the signal read, relative distance to the object on per pixel level may be determined. There is variety of known techniques that allow estimation of distance for depth and distance sensors. For example, PrimeSense based, Microsoft Kinect camera, makes use of IR emitter coupled with monochrome CMOS sensor. The resulting picture is black & white, distance is measured based on coloration. White may correspond to far and black may correspond to near.

In one embodiment, the depth measuring sensor 909 may be implemented as EM-CCD sensor.

Also, the depth measuring sensor 909 may be implemented as miniaturized HPD (Hybrid photo-detectors).

Further, exemplary embodiment, the depth measuring sensor 909 may be implemented as PIR (Passive Infrared Sensor). This sensor type of sensors detects changes in infrared radiation not requiring visible light.

In one embodiment, the depth measuring sensor 909 may be implemented as miniaturized capacitance-detection type of infrared sensor utilizing the principle of Golay-cell.

In one embodiment, the depth measuring sensor 909 may be implemented as range finder, with variety of radar or lidar types of solutions.

In one embodiment, an active contact lens substrate 901 integrates display device 903. Display is positioned over cornea of the eye 902, so that center of display is positioned against iris of the eye.

In one non-limiting, exemplary embodiment, power supply module 905 is integrated into the contact lens substrate.

In one embodiment, Power supply module 905 provides electric power to the entire active contact lens. Power supply module may derive electric power from energy transfer antenna 908. Antenna 908 may receive its power from RF power source located nearby. Power supply may comprise capacitor unit, battery or accumulator unit to continue to supply electricity from the local storage when the external power delivery is not available.

In one embodiment, the power supply 905 module may derive electric power from an onboard, integrated solar panel, radio frequency power source, electrochemical power source, temperature power source, or mechanically derived power source (e.g., MEMs system).

In one embodiment, electric power may also be gained from variety of sensors that are integrated into the contact lens. For example, image capture sensor, is reactive to light, and may be configured to generate electricity in passive mode. Also, heat sensor, conductivity, magnetic and other electromechanical sensors.

In one embodiment, contact lens substrate 901 may incorporate an onboard integrated communication module 906. Communication module includes a wireless antenna 908 (e.g., an RF antenna). Wireless radio antenna arranged to communicate with an external server.

Communication module 906 may be used to a) request information from remotely available source, b) receive response from remotely available service also c) communication module 906 may be used to get location information, instructions, optionally eye gaze direction from an off-board eye position tracking sub-system, optionally head directions from an off-board location determination sub-system that may be located remotely but in close vicinity of the user's contact lens, any other data may be fed back via the communication channel. d) send to the server an image information collected by an integrated depth image capture device.

In one embodiment, the communication module 906 may comprise, various electronic components for example: transceiver coupled with wireless antenna 908. Communication module 906 may include onboard memory and a sub-processor along with other miniaturized electronic components, such as nonoelectronics and MEMS based systems and other types of miniaturized electronics.

The processor module 910 may include a) processor b) operating RAM memory, ROM memory, EPROM memory, EEPROM or DROM memory, and non-volatile RAM (NVRAM) memory, c) permanent memory.

In one embodiment, the processor module 910 may comprise variety of miniaturized Micro-Electro-Mechanical Systems (MEMS) based sub-systems.

In one embodiment, the processor module 910 may be built with carbon nanotube based crossbar memory, for example: Nano-RAM or memristor technology. Any other memory device based on spintronics principle may be utilized.

In one embodiment, MRAM based on GMR and TMR effects may be utilized for memory construction, any other nonoelectronics component may be used.

In one embodiment, the processor module 910 may be arranged to manage communication between contact lens and remotely available service.

In one embodiment, the processor module 910 may output visual information to the embedded display device 903 and audio information to audio output device Image data coupled with audio signal creates a better augmented reality experience.

It should be understood that the structural and functional description of the processor module 910 or other electronic components of the system provided here are exemplary and illustrative only and should not be conceived as being limiting to the scope of the invention. Any miniaturized information processing component(s) may be utilized for the processing module 910.

In one embodiment, the processor module 910 may be configured to function as a controller of IR emitter and depth measuring sensor 909. The processor module 910 may process output from depth measuring sensor 909.

In one embodiment, Processor module 910 may process output from depth measuring sensor 909 to track changes in the environment and to determine and recognize objects in the environment.

In an embodiment, the system may comprise both depth measuring sensor as well as image capture sensor. Together, may be configured to produce complete 3D dataset of the environment from user's perspective view. 3D dataset may represent 3d model, 3d point cloud, combination of 2D RGB color image and 2D depth image and variety of other ways to represent 3D spatial data.

In one embodiment, the contact lens substrate may integrate electronic circuit and information bus 907, which may connect integrated, onboard, electronic or electro-optical devices/sensors. Electronic circuit and information bus 907 may also, serve to provide electric power to all constituent components of the active contact lens system.

FIG. 10 depicts a detailed flow diagram for the 2D FoR or 3D FoR variation of the active mode process. The process starts at 1001, for example, by turning the contact lens system to an "ON" state. At step 1009, Frame Of Reference is determined to be 3D FoR or 2D FoR.

Furthermore at step 1003 eye gaze direction is determined. At step 1004, direction of the head is optionally determined especially for 3D FoR. Steps 1003 and 1004 may be combined and direction of the eyes' gaze may be determined by the embedded into the contact lens orientation module. Whereas, orientation module may determine absolute or relative direction of the eye's directional vector. The measurement may be expressed in various ways, for example, as linear vector, rotation matrices, Euler angles, trigonometric angle measure or any other mathematical construct. In one non limiting, exemplary embodiment, at step 1003, the system may determine change of eye's direction change by correlating color or depth images taken by an image capture device against pre generated 3D model of environment. 3D model of reality could be pre-generated and built based on input of the color or depth sensors. In present embodiment depth sensor provides orientation relative to the 3D environment of the user.

At step 1002, directional orientation of gaze is determined, relative to 3D FoR or 2D FoR.

At step, 1011 the system determines the anchor point from which the eye's gaze tracking starts.

At step, 1010 the system determines and tracks eye's focus. Based on changes in the eye's focus the system may determine an anchor point, when, for example, the Frame of Reference changes.

By tracking changes in the focus of the eye, the system may determine whether the eye is focused on the image superimposed on display or the real world objects in front of the eye.

In one non-limiting, exemplary embodiment, the user may trigger taking base point reference by tracking focus of the eye, in real-time, to determine whether the eye focusing on the objects at a distance or it is focused on the image on display. This method may be used to switch between Frame of References and for registering anchor point at the same time.

Variety of other detectors of a switch in gaze between outside real object and overlaid image are possible. Methods given above are exemplary only and should not be taken as being limiting to the scope of the invention.

In one non-limiting, exemplary embodiment, the system may predefine or dynamically determine where base point reference should be and when the tacking, against said point reference, should stop. The system may stop tracking position of the eye and correlate changes of eye's vector to the image disposition on display at stop point. Stop point may be signaled with hand gestures, voice or other signals. Stop signal may be signaled by change of focus from image on display to the real world objects in front of the user. There may be variety of other ways to detect stop point. For 2D FoR, once stop signal is identified, the image on display may return to its original disposition; regardless of the position of the eye.

Furthermore, at step 1005, display adjustment factor is computed based on combined delta in the head and eye's gaze direction relative to the base reference position.

In one non-limiting, exemplary embodiment the display adjustment factor is computed based on the measurements from any combination of orientation determination and gaze tracking mechanisms.

In one non-limiting, exemplary embodiment the display adjustment factor is computed based on the difference in estimated direction of the eye. Estimation of direction is performed by analyzing color or depth images taken by image or depth capture device integrated into the contact lens. Also, various integrated range finders may be used to estimate depth/distance. Estimation of eye gaze direction may be performed by utilizing Similarity Invariant Descriptors (SID), for example, Scale-Invariant Feature Transform (SIFT) or Gradient Location and Orientation Histogram (GLOH) algorithms or any other methods. These algorithms may be applied to juxtapose and correlate the two images that are taken at different times, to detect differences; and from the delta reverse compute gaze direction and change of the gaze overtime.

Further at step 1006, compute per pixel display matrix, so that image shift is reflective of the shift in the eye's position. Computation of the latest display matrix may be carried out by the system's processing module; processing module may be integrated into the contact lenses or alternatively may be disposed on a remote device. At step 1007, refresh screen and display recomputed image so that sought portion of an image comes into focus at the center of the display. This process may be executed in a loop. The process stops at step 1008 with either predefined user triggered action or refocus or switch to another Frame of Reference or any with some other signal.

It is to be understood that the all above descriptions and embodiments are intended to be illustrative, and not restrictive. For example, the above-described embodiments (and/or aspects thereof) may be used in combination with each other. In addition, many modifications may be made to adapt a particular situation or material to the teachings of the subject matter disclosed herein without departing from the spirit of the invention and its scope. Many other embodiments will be apparent to those of skill in the art upon reviewing the above description. The scope of the subject matter disclosed herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. This written description uses examples to disclose the various embodiments of the subject matter disclosed herein, including the best mode, and also to enable any person skilled in the art to practice the various embodiments of the subject matter disclosed herein, including making and using any devices or systems and performing any incorporated methods. The patentable scope of the various embodiments of the subject matter disclosed herein is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A contact lens system, comprising:
   a contact lens substrate movable in synchronism with an eye of a user;
   an embedded display component forming a part of the contact lens substrate: and a processor arranged to shift at least a part of an image to a central position of the embedded display to bring the part of the image into focus on the said embedded display;

wherein the shifting of the at least part of the image to the central position of the embedded display is performed in response to a detected attempt to refocus or accommodate on part of the image in a peripheral view which is out of focus.

2. The contact lens system of claim 1, wherein an application executed by said processor establishes a two-dimensional frame of reference or a three-dimensional frame of reference.

3. The contact lens system of claim 2, wherein the processor is further configured to: track an eyes gaze movement or a head movement of said user of the contact lens and correlate the tracked eyes gaze movement and the head movement with the three-dimensional frame of reference of space around the user of the contact lens, to determine a direction and extent of a shift of the image on the embedded display; or track changes in the eyes gaze direction of the user of the contact lens and correlate the tracked changes with the two-dimensional frame of reference of the embedded display to determine the direction and extent of the shift of the image on the embedded display.

4. The contact lens system of claim 3, wherein the shifting of the at least a part of the image is triggered in an event of a change in the said eyes gaze direction or in an event of reception of a predefined signal from the user of the contact lens.

5. The contact lens system of claim 4, further comprising one or more orientation sensors embedded in the contact lens substrate to determine the change in the eyes gaze direction.

6. The contact lens system of claim 1 further comprising a depth sensor embedded in the contact lens substrate, wherein a change in eyes gaze direction is determined based on depth images captured by the depth sensor.

7. The contact lens system of claim 6 wherein: the processor tracks changes in an environment of the user of the said contact lens using a forward facing depth sensor's or image capture sensor's output and to determine and recognize objects in the environment using the tracked changes of the environment to display the objects in focus on the embedded display.

8. The contact lens system of claim 1, wherein the processor shifts the part of an image to the central position of the said embedded display based on a shift factor; wherein the shift factor indicates direction and extent of the shift of the image on the embedded display.

9. The contact lens system of claim 1 further comprising a communication device embedded in the contact lens substrate, the communication device configured to communicate with one or more external communication device or with another paired contact lens.

10. The contact lens system of claim 1 further comprising a depth or color image sensor embedded in the contact lens substrate, wherein the contact lens system uses depth information to map environment around the user.

11. A contact lens system, comprising:
a contact lens substrate movable in synchronism with an eye of a user;
an embedded display component forming a part of the contact lens substrate;
a processor arranged to shift at least a part of an image to a central position of the embedded display to bring the part of the image into focus on the said embedded display; and
a focus detection sensor, wherein the said focus detection sensor is configured to read direct, non-purjunke, reflection of the crystalline lens or the said detection sensor is configured to detect electric impulses of ciliary muscles indicating change in crystalline lens shape;

wherein the shifting of the at least part of the image to the central position of the embedded display is performed in response to a detected attempt to refocus or accommodate on part of the image in a peripheral view which is out of focus.

12. A method fora contact lens movable in synchronism with an eye of a user comprising:
computing a shift, in an image disposition, on an embedded display;
displaying at least part of said image at a central position of the embedded display to bring at least part of said image into focus;
wherein, the said embedded display component forming part of a contact lens substrate of said contact lens; and
wherein the step of computing the shift is performed in response to a detected attempt to refocus or accommodate on part of the image in a peripheral view which is out of focus.

13. A method of claim 12, further comprising:
establishing a two-dimensional frame of reference or a three-dimensional frame of reference.

14. A method of claim 13 further comprising:
tracking eyes gaze movement or head movement of the user of the contact lens and correlating the tracked eyes gaze movement and the head movement with the three-dimensional frame of reference around the user of the contact lens, to determine a direction and extent of a shift of the image on the embedded display; or
tracking changes in eyes gaze direction of the user of the contact lens and correlating the tracked changes with the two-dimensional frame of reference of the embedded display to determine the direction and extent of the shift of the image on the embedded display.

15. A method of claim 14, wherein the shifting of the at least a part of the image is triggered in an event of a change in eyes gaze direction or in an event of reception of a predefined signal from the user of the contact lens.

16. A method of claim 15 further comprising: obtaining orientation information from one or more orientation sensors embedded in the contact lens substrate to determine the change in the eyes gaze direction.

17. A method of claim 12 further comprising: computing, using a processor, the shift of at least part of the image on the said embedded display based on a shift factor; wherein the shift factor indicates direction and extent of the shift of the image on the embedded display.

18. The method of claim 12 further comprising, obtaining depth information about an environment of the user of the contact lens from an embedded depth or image sensor in the contact lens substrate wherein, a change in eyes gaze direction is determined based on depth information captured by the depth or image sensor.

19. The method of claim 12 further comprising a communication device embedded in the contact lens substrate, the communication device configured to communicate with one or more external communication device or with another paired contact lens.

20. A method of claim 12 further comprising:
identifying or tracking focus of an eye information.

21. A method of claim 20 further comprising:
utilizing eye focus information to identify an anchor point.

* * * * *